(12) United States Patent
Peter

(10) Patent No.: US 6,187,373 B1
(45) Date of Patent: Feb. 13, 2001

(54) METHOD AND DEVICE FOR WASHING AND DRYING GLASS TUBES FOR LAMPS

(75) Inventor: Arnold Peter, Kissing (DE)

(73) Assignee: Patent-Treuhand-Gesellschaft fuer elektrische Gluehlampen mbH, Munich (DE)

(*) Notice: Under 35 U.S.C. 154(b), the term of this patent shall be extended for 0 days.

(21) Appl. No.: 09/242,011

(22) PCT Filed: May 13, 1998

(86) PCT No.: PCT/DE98/01330
   § 371 Date: Feb. 5, 1999
   § 102(e) Date: Feb. 5, 1999

(87) PCT Pub. No.: WO98/57346
   PCT Pub. Date: Dec. 17, 1998

(30) Foreign Application Priority Data

Jun. 10, 1997 (DE) .............................. 197 24 362

(51) Int. Cl.⁷ ...................................... B05D 7/22
(52) U.S. Cl. .................. 427/106; 427/157; 427/231; 427/346; 427/372.2; 118/55; 118/312; 118/416; 118/681
(58) Field of Search ................ 427/231, 64, 66, 427/67, 157, 346, 372.2, 289, 105, 106; 118/622, 55, 416, 500, 312, 302, 681

(56) References Cited

U.S. PATENT DOCUMENTS

| | | | |
|---|---|---|---|
| 4,138,161 | * | 2/1979 | Payne ...................................... 302/28 |
| 4,308,297 | * | 12/1981 | Yamazaki et al. ...................... 427/67 |
| 5,212,000 | * | 5/1993 | Rose et al. ........................... 428/34.7 |
| 5,560,958 | * | 10/1996 | Duzyk et al. ........................... 427/67 |
| 5,686,134 | * | 11/1997 | Bernicke et al. ....................... 427/72 |
| 5,890,940 | * | 4/1999 | Rozema, Jr. et al. .................... 445/2 |

OTHER PUBLICATIONS

Patent Abstracts of Japan, vol. 095, No. 005, Jun. 30, 1995 & JP 07 031932 A (NEC Home Electron Ltd). Feb. 3, 1995.

Patent Abstracts of Japan, vol. 013, No. 364 (E–805), Aug. 14, 1989. & JP 01 120727 A (Mitsubishi Elecric Corp), May 12, 1989.

* cited by examiner

Primary Examiner—Shrive Beck
Assistant Examiner—Jennifer Calcagni
(74) Attorney, Agent, or Firm—Carlo S. Bessone (57) ABSTRACT

A presentation is given of an improved method for coating lamp tubes for gas discharge lamps and for drying the coating, as well as of a device designed for the method, in the case of which method and device, during coating and drying, the lamp tubes are arranged at an oblique angle to the horizontal.

17 Claims, 5 Drawing Sheets

METHOD AND DEVICE FOR WASHING AND DRYING GLASS TUBES FOR LAMPS

The invention relates to a method and a device for producing bulbs for lamps, in particular discharge lamps and/or fluorescent lamps. It follows thus that it relates to a part of the method for producing fluorescent lamps, to be precise, in particular, that in which the glass tubes generally used as lamp tubes are coated from inside with a fluorescent layer which is as uniform as possible, and this layer is dried thereafter.

To date, methods have been used for this purpose in which, during coating, the lamp tubes stand or are suspended vertically and are coated with a pasty coating means starting from the top side.

Drying has also been performed in a vertical position by feeding warm air from above and partly also from below or by infrared radiation from outside with simultaneous air flushing of the interior of the lamp tube.

The following disadvantages have become plain in this case:

In order to ensure that the inflowing coating means is distributed on the inner wall of the lamp tubes as far as the upper end, appropriately shaped coating valves and relatively high inflow rates have been necessary. This holds, in particular, for lamp tubes with so-called "roll-ins", that is to say tapers at the tube ends. It was particularly problematical in this case to pass the coating means into the upper shoulder region produced by the roll-in. The required high flow rates led, on the one hand, to contamination problems for the corresponding device or system and, moreover, caused eddies of the coating means in the lamp tube which become visible in the finished lamp in the form of streaks, cloudiness, stripes or run-off noses.

Furthermore, there were irregularities in the layers to be produced, specifically in the form of oblique coating edges on the upper tube ends in the case of inexactly centered lamp tubes or incomplete coverage in the case of lamp tubes not suspended or standing exactly vertical.

The following difficulties arose in connection with the drying:

Hot air drying systems require long drying times and require a considerable amount of space, in particular in the case of continuously traversing bulbs. Furthermore, irregular layer thicknesses occur over the length of the lamp tubes, in particular very thin layer thicknesses occur at the upper end and undesirably large thicknesses at the lower end. Moreover, the hot air leads to the formation of stains in the coating of those bulb regions which are touched by the bulb supporting elements.

In the case of infrared drying, it has been necessary to rotate the lamp tubes about the longitudinal axis of the tube in order to achieve uniformity of the layer thicknesses. The required rotation devices have not only been relatively expensive but also vulnerable—particularly in connection with contamination problems caused by the coating. Furthermore, glass breakage has led to a high rate of rejection.

Independently of the above discussions, the invention proceeds very generally from a method for producing bulbs for lamps, in which lamp tubes are coated with a coating means and dried thereafter, and from a device for carrying out this method.

The term "tube" comprises in this case all suitable shapes with two open ends which can be connected by an axis, here termed longitudinal axis; symmetry is not required.

The technical problem on which the invention is based here is to improve said method and said device with regard to their operating characteristics and their efficiency.

This problem is solved by means of a method in which, during coating and drying, the lamp tubes are arranged with their longitudinal axis at an oblique angle to the horizontal, and by a device having a holding device with one or more lamp tube positions situated at the oblique angle to the horizontal.

The invention renders high flow rates of the coating means superfluous, because owing to the oblique position the upper edge of a lamp tube can be reached much more easily by the coating means. This also holds, in particulr, for lamp tubes with roll-ins or comparable complicating geometrical shapes. The sensitivity with respect to eccentric or tilted positions is also of no importance.

In the case of a partial coating (coating not over the entire circumference but only as longitudinal strips such as, for example, with reflector lamps) the method according to the invention can be carried out successfully without rotation about the longitudinal axis. If, however, a uniform layer is to be produced around the tube circumference, the lamp tubes are rotated about their longitudinal axis in the oblique position. The invention exhibits particular advantages in this case, because it is precisely in the case of lamp tubes coated all round that uniformity is particularly important.

The efficiency of the invention with respect to the uniformity of the layers to be achieved can be further increased when coating and drying are performed not only in the same oblique angular position and with the same rotation about the longitudinal axis, but there is also no interruption of this state of position or movement in the meantime. If changes in the state of position or movement are unavoidable, they should be performed as slowly and uniformly as possible. Specifically, it has proved that any, in particular abrupt change in movement or position leads to impairment of this uniformity. The aim is thus to ensure in the lamp tubes a state of flow which is as continuous and uniform as possible both during coating and during drying.

Devices and methods according to the invention are further simplified by virtue of the fact that the continuity, already addressed, in the oblique position and the rotation about the longitudinal axis is enhanced by a continuous transport process, preferably essentially transverse to the direction of the longitudinal axis. The lamp tubes can thereby be transported simply and uniformly through different stations of a device according to the invention in which coating steps, drying steps and also other method steps are carried out.

With respect to the angle, defining the oblique position, of the longitudinal axis of the lamp tubes to the horizontal, it has proved that the inventive advantages are already achieved by each clear deviation from the vertical position, that is to say approximately from 85°. A lower limit for the angle results from the fact that no gravity flow occurs in the horizontal position. An lower limit can thus be situated at a few degrees, preferably approximately at 5°. It is true that a small angle slows down the flow through the lamp tubes, but it leads to particularly uniform results. Consequently, angles of between 5 and 15° are preferred. However, a suitable lower limit can also be 10°, while suitable upper limits can also be 75°, 60°, 45° or 30°. If a roll-in or taper is present on the lower end of the lamp tubes, this angle is to be increased by an angle typifying the roll-in or taper. Otherwise, there is a risk of coating means building up in front of the lower end, and thus of irregularities being formed in the layer. This characteristic angle is that for which the coating means does indeed run out slowly from the corner formed by the roll-in; it frequently amounts to approximately 45°.

The disadvantages of conventional rotation devices for lamp tubes which have been used in drying by means of infrared radiation have already been described in the above discussions on the prior art. Furthermore, it has already been explained that the invention is advantageously carried out with a rotation of the lamp tubes about the longitudinal axis both during coating and during drying. According to the invention, the device is further developed for this purpose by providing two transport devices instead of one, which act separately on the lamp tubes in such a way that a speed difference between them ensures rotation of the lamp tubes about the longitudinal axis. The disadvantages of the conventional rotation devices are thereby avoided. The solution according to the invention proves effective above all in the case of the said continuous transverse transport of the lamp tubes through the coating and drying stations of an overall system, because the complicated co-movement of a dedicated rotation device is eliminated.

It has, furthermore, proved to be a particularly simple solution to provide a stop device at the lower end of the lamp tubes, so that the lamp tubes are, moreover, held only in a supported fashion and need not be secured against a movement along the longitudinal axis (slippage). In this case, the stop device itself can be movable, in particular it can move in sympathy with the lamp tubes at the speed of the respective contact sites in order to avoid friction problems, for example for the rotational movement of the lamp tubes. In the case of a rotation of the lamp tubes about the longitudinal axis, this means therefore that the lamp tube rolls on the stop device. Finally, the movement of the stop device can be selected such that the stop device takes over the function of one of the two above-named transport devices for generating a speed difference. For this purpose, it must move with an effective speed—lateral speed of the transport movement corrected by the path speed of the contact site.

According to an embodiment which has particularly proved itself in practice, a transport device which simultaneously takes over the function of a holding device is constructed by providing at least one chain drive provided with special supporting elements. The supporting elements are designed and attached such that in the extended state of the chain they form an essentially continuous, that is to say essentially seamlessly coherent transport path. The supporting elements can, for example, be blocks made from a suitable material. However, it is also possible to provide spring sheets, for example, for bridging interspaces between the chain links.

The essentially continuous construction of the path formed by the transport device on the one hand protects the chain drive situated therebelow from contamination and, on the other hand, ensures trouble-free and reliable transport operation, above all when rotation is generated about the longitudinal axis by a speed difference and, associated therewith, when the lamp tubes roll on the path. In particular, it is also possible to provide at least two of these chain drives in order to form the two transport devices described; likewise, said stop device can be formed—separately or as one of the two transport devices—from such a chain drive.

However, there are also other possibilities for designing a pure transport device or combined holding/transport device, for example a chain drive with separating elements, for example projecting pins, which separate the lamp tubes. It is shown in the exemplary embodiment that it is also possible for different types of holding/transport devices to be combined.

In connection with introducing the coating means into the lamp tubes, it has proved to be particularly favorable with regard to reliability and freedom from maintenance entirely to dispense with the conventional valves (valve plugs in the coating nozzles). Instead of this, use is made of a flow-deflecting device which, as part of a device for introducing coating means, can be switched to and fro between two positions, an introducing position and a discharging position. In one position, the coating means is introduced into the lamp tubes, whereas in the other position it is discharged into a return device. Thus, the flow of coating means is not switched on and off, but deflected, a valve thereby being superfluous. Nevertheless, the return device can minimize the consumption of coating means. Moreover, a return device can, of course, also be provided at the lower end of the lamp tubes, as well as generally below the device according to the invention.

BRIEF DESCRIPTION OF THE DRAWINGS

The figures are used below to explain an exemplary embodiment of an inventive device, this descriptive section also serving to illustrate the method according to the invention. Features disclosed in this case can also be essential to the invention inherently or in other combinations. In detail, in the drawing.

DETAILED DESCRIPTION

Figure 1:
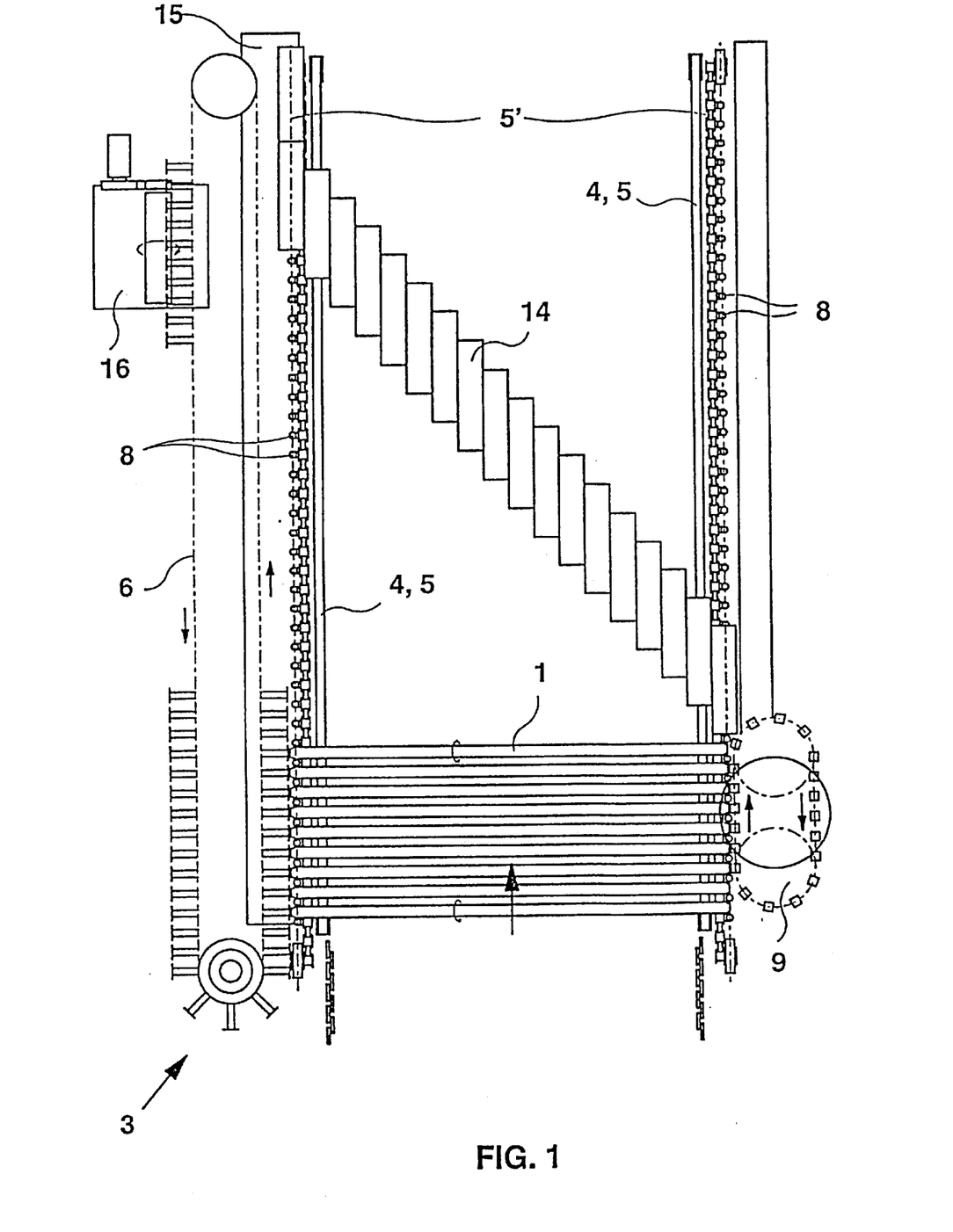
FIG. 1 shows a diagrammatic top view of a device according to the invention.

FIG. 1 shows in overview a top view of an inventive device 3 for coating and drying lamp tubes 1. Illustrated in the lower region are a plurality of parallel lamp tubes 1 which move in the direction of the arrow, that is to say from bottom to top in the figure, through the device 3. In this case, they are located according to the invention uninterruptedly in an oblique position relative to the horizontal and rotate simultaneously continuously about their longitudinal axis.

Figure 2:
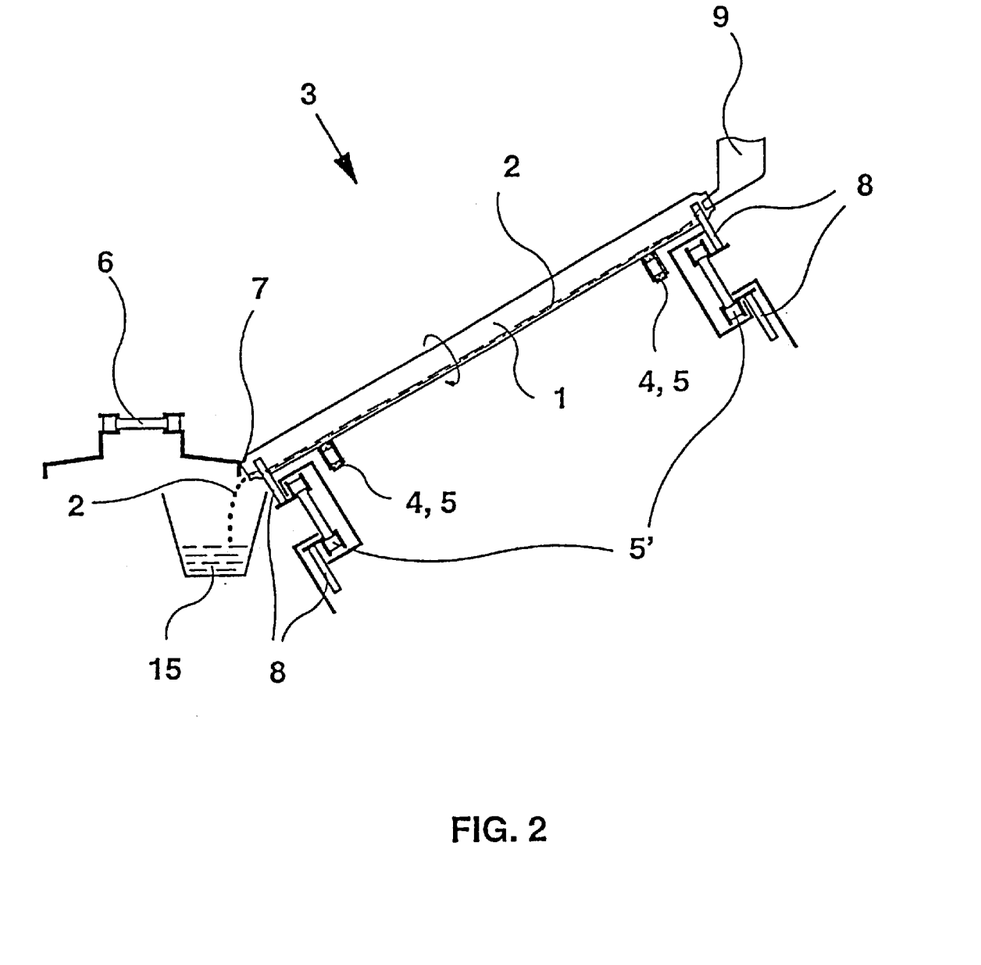
FIG. 2 shows a diagrammatic side view of the inventive device in the coating region, which view corresponds to a cross section, seen from below, along a horizontal line through the lower part in FIG. 1.
Figure 3:
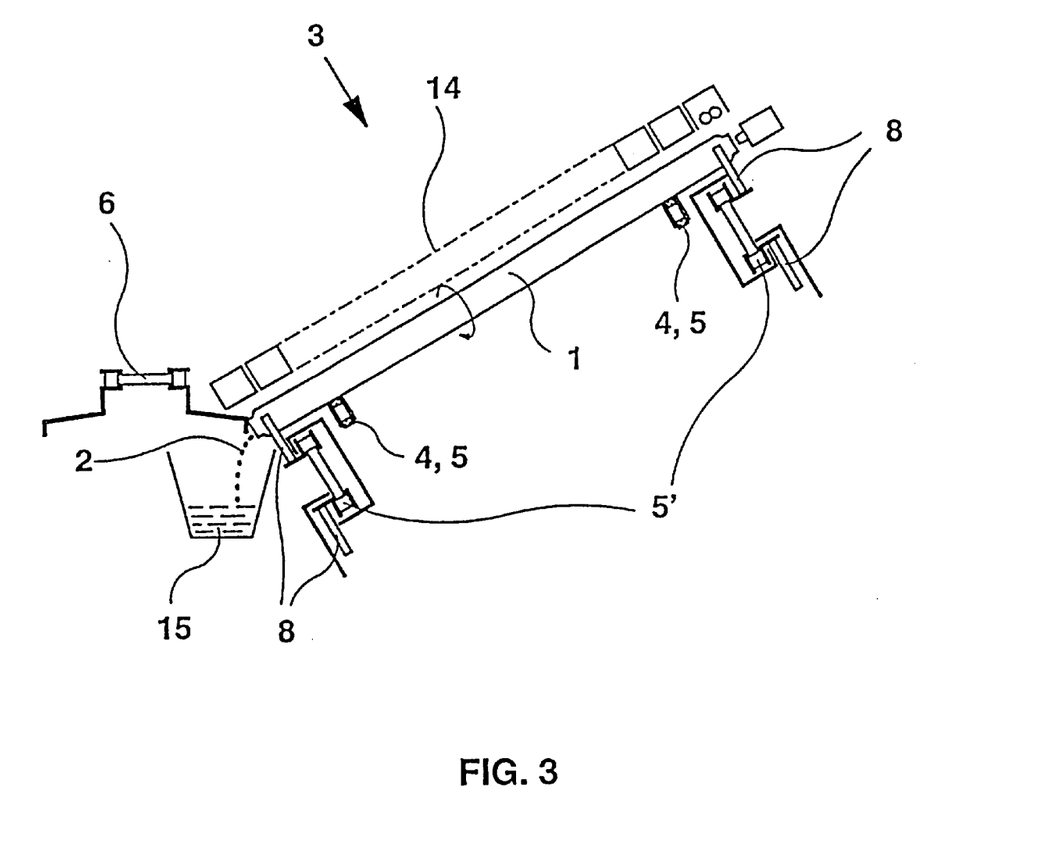
FIG. 3 shows a diagrammatic side view of the inventive device in the drying region, which view corresponds to a cross section, seen from below, along a horizontal line through the upper part in FIG. 1.

This becomes clearer from FIGS. 2 and 3, which in each case show a cross section taken from the perspective from below, and specifically, in FIG. 2, in the lower region of FIG. 1 in the case of the device 9 for introducing coating means, and in FIG. 3 in the upper region of FIG. 1 in the region of an infrared radiation heater 14. In particular, the rotation of the lamp tubes 1 about the longitudinal axis is indicated in FIGS. 2 and 3 by a round arrow.

The position, transport movement and rotation of the lamp tubes 1 about the longitudinal axis is effected by the cooperation of the following parts of the device 3:

Firstly, the lamp tubes 1 rest on a holding device 4, which extends along the transport path of the lamp tubes 1 in the device 3 and is simultaneously a transport device 5. This holding and transport device comprises a chain drive (already described at the beginning) with supporting blocks which form a coherent transport path in the extended state. It is to be seen in FIG. 1 that the chain drive forming the holding and transport devices 4, 5 is provided as a pair of two individual drives which are located in each case under the lamp tube 1 at a specific spacing from an end of the lamp tube. In this case, the transport paths are illustrated as strips and, in FIGS. 2 and 3, as rectangular cross sections through the supporting blocks.

The spacing from the respective end of the lamp tube is dimensioned such that there is room in each case on the lamp-tube end side of the described holding and transport devices 4, 5, or the chain drive with the supporting blocks, for a second transport device 5'. This second transport device 5' is, in turn, constructed as a pair of two individual chain drives, which are arranged below the lamp tubes 1 at their two ends and are provided in each case at the chain with separating elements 8 in the form of pins projecting outwards from the chain. These pins 8 are the part of this transport device 5' which touches the lamp tubes 1. The pins 8 separate the lamp tubes 1 from one another and transport them along the transport path corresponding to the vertical in FIG. 1.

The two transport devices 5, 5' are each driven, the first by means of the supporting blocks and the second by means of the separating pins 8, specifically at a somewhat different speed. Consequently, the pins 8 prescribe the linear speed of the lamp tubes, while the supporting blocks, which move somewhat more quickly, on the first holding and transport devices 4, 5 run more quickly by an amount corresponding to the path speed of the lamp tube circumference in the case of rotation about the longitudinal axis.

In order to prevent the lamp tubes 1 from slipping in the oblique position illustrated (at the bottom to the left in FIGS. 2 and 3), a stop device 6 is additionally provided in the left-hand region of the device 3. The latter equally comprises a chain drive with individual stop elements which are driven by the chain drive along the transport path such that their sites of contact 7 with a lamp tube 1 remain free from friction in each case. That is to say, when rotating about its longitudinal axis the lamp tube 1 rolls on a contact site 7 which undergoes displacement relative to the stop device 6. So that this can take place uniformly and free from interruption, the stop elements of the stop device 6 are provided in each case on their outer part with plates which, in a way similar to the supporting blocks of the holding and transport devices 4, 5, form a continuous path with the stop elements in the extended state of the chain.

Indicated respectively in FIG. 1, bottom right, and in FIG. 2, top right, is a device 9 for introducing coating means which is described further below more precisely with the aid of FIGS. 4 and 5. The only important point in the present connection is that the device 9 for introducing coating means indicated in FIG. 2 permits a viscous coating means 2 to flow into an upper opening of each lamp tube 1. As is to be seen in FIG. 1, this takes place while the outlet runs along with the lamp tubes over a short distance at the start of the transport path. According to the invention, the coating means 2 runs down slowly and uniformly in the lamp tube 1, starting from its upper edge, and is distributed uniformly on the entire inner surface of the lamp tube 1 as it runs down by the rotation about the longitudinal axis. The rate of rotation about the longitudinal axis and the oblique angle which is essential to the invention and is prescribed by the relative arrangement of the respective elements in the pairs formed from the first holding and transporting devices 4, 5 and the second transport device 5' are important parameters for the coating produced. In this case, at least the rate of rotation about the longitudinal axis can be set by the difference between the transport speeds; furthermore, the angle can also be set by appropriately suspending the devices 4, 5 and 5'.

Excess coating means 2 flows out of a lower end of the lamp tube 1 into a channel 15 which belongs to a return device 13 for coating means for return and reuse, which is further mentioned below. The contact site 7 between the end of the corresponding stop element of the stop device 6 and the lamp tube 1 is arranged to be so high in this case, and the end of the stop element is dimensioned to be so small at the bottom that the coating means 2 flowing out downward does not run along the stop device 6. Nevertheless, the fact that, as described, the lamp tube 1 rolls on the contact site 7 on the path formed by the stop elements of the stop device 6 produces a slight contamination by the upper edge, wetted with coating means, of the lower opening of the lamp tube 1. Consequently, a washing device 16 is provided on the side, averted from the lamp tube, of the chain drive belonging to the stop device 6. Said washing device is illustrated in FIG. 1, top left, where it may be seen that a rotating brush cleans the ends of the stop elements.

Further in evidence in FIG. 1, bottom right, is the fact that after leaving the part of the transport path at which the device 9 for introducing coating means is arranged, the lamp tubes 1 enter the region of an infrared radiation heater 14 extending diagonally over the transport path and the length of the lamp tubes 1. It transpires, in conjunction with FIG. 3, that individual elements of this radiant heater 14 in each case heat a portion of the length of a lamp tube 1, it being the case that in the temporal sequence of the transport through the device 3, the end of the lamp tubes which is arranged higher is firstly heated, and then parts of the lamp tubes which lie deeper step by step are heated down to their lower end. The detail of the heating and drying process can be checked by the linear transport speed through the device 3, on the one hand, and by the diagonal arrangement of the radiant heater 14 relative to the transport path and the power of the individual elements of the radiant heater 14, on the other hand.

As is to be seen in FIG. 3, the radiant heater 14 is arranged above the lamp tubes in order reliably to exclude impairment of the radiant heater 14, and thus of the drying process by contamination and thus coverage with coating means. In this case, the heater runs in the perspective of FIG. 3 essentially parallel to the lamp tubes 1. Since, owing to the fact that the invention disposes of high inflow speeds for the coating means 2 leaving the outlet of the device 9 for introducing coating means, only very low contamination, or virtually none, occurs outside the interior of the inner tubes 1, the capture channel 15 and the stop device 6, the holding and transport devices 4, 5 and the transport device 5' with the pins 8 can run in a fashion arranged below the lamp tubes 1, with the result that they can be designed in a simple way to traverse the entire transport length of the device 3, and yet the radiant heater 14 (on the other side) can be brought very near to the lamp tubes 1 without colliding with these devices. As a result, improvement in the efficiency of the radiant heater 14 is also achieved in addition to the structural simplification.

Figure 4:
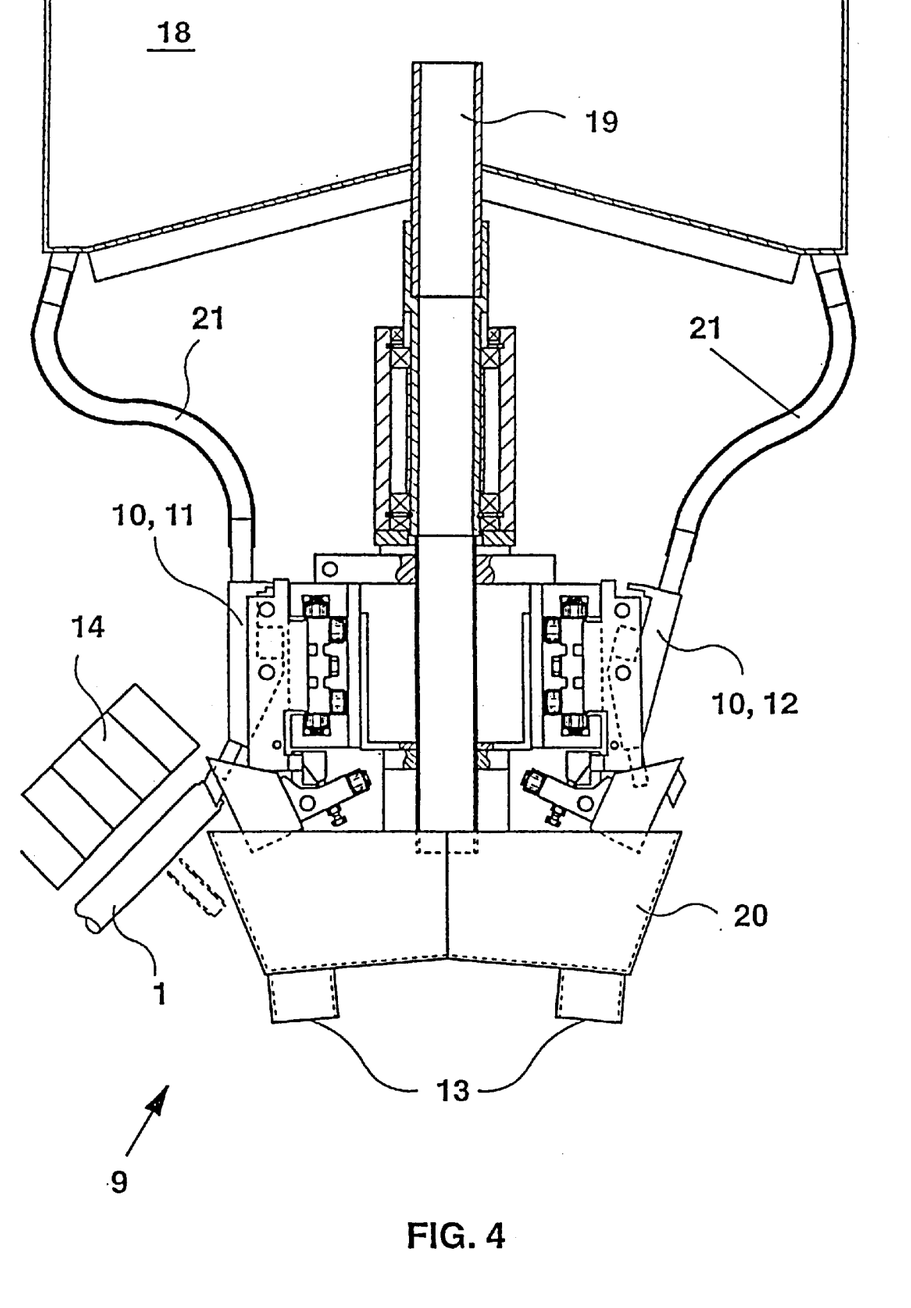
FIG. 4 shows a cross section through a device for introducing coating means, which is indicated in FIG. 1, bottom right, as part of the inventive device.
Figure 5:
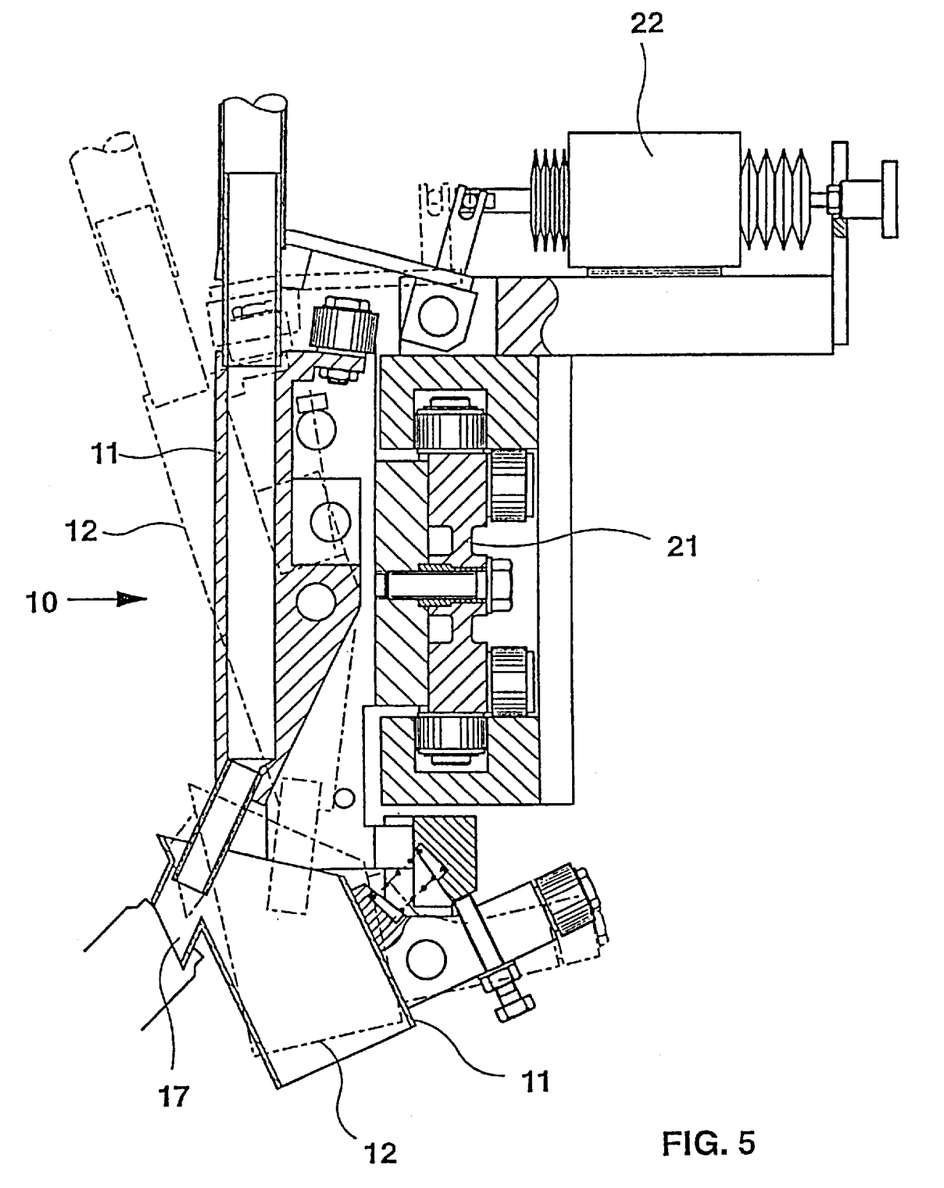
FIG. 5 shows a detailed view of the device for introducing coating means of FIG. 4, for the purpose of illustrating the functioning of a flow-deflecting device.

FIGS. 4 and 5 show the device 9 for introducing coating means, which accomplishes the described low-contamination and slow inflow of the coating means 2 into the lamp tubes 1 through a simple outlet 17 of a flow-deflecting device 10. The outlet 17 and the flow-deflecting device 10 are illustrated in more detail in FIG. 5, which shows the left-hand lower region of FIG. 4 with further details. The flow-deflecting device 10 here comprises two parts, an upper and a lower one, which are shown in FIG. 5 in an introducing position denoted by continuous lines and by 11, and in a discharging position denoted by dashed lines and by 12. FIG. 4 shows the flow-deflecting device 10 only in the introducing position 11.

In FIG. 4, there is firstly illustrated in the upper region a container 18 for the coating means 2, from which an overflow pipe 19 leads centrally into a trough 20 arranged below the entire device 9 for introducing coating means. As indicated by the reference 13, the trough 20 is further connected to the already mentioned return device 13 for coating means.

Leaving aside the overflow pipe 19, the coating means 2 flows via hoses 21 into the flow-deflecting device 10, which, as is likewise to be seen in FIGS. 4 and 5, leads the coating means 2 through two tube lengths to the outlet 17, which is arranged—in the introducing position 11—in the upper end of the lamp tube 1. In the second discharging position 12 marked by dashes in FIG. 5, the two tube lengths and a funnel connected to the outlet 17 are tilted such that the coating means 2 is guided through the tube lengths and the funnel not to the outlet 17 but into the trough 20. As already mentioned, this changeover of the flow-deflecting device 10 replaces the conventional inflow valve, it being the case according to the invention that no valve, no axes, nor any other mechanical parts sensitive to contamination come into contact with the coating means 2. Rather, it is possible to have a continuous throughflow which is merely switched to and fro between the outlet 17 and the channel 20 by the tilting movement illustrated.

The device 9 for introducing coating means has a multiplicity of individual flow-deflecting devices 10 which are moved along the oval path illustrated in FIG. 1 by a chain drive—illustrated in FIG. 5—, with the result that they run along with individual lamp tubes 1 in each case on the long side, facing the lamp tubes 1, of the oval, and in so doing can fill said lamp tubes. At the same time, as indicated likewise in FIG. 4, the container 18 rotates in a circle, the geometrical deviation between the oval and the circular movement of the container 18 being compensated by the flexibility of the hoses 21. In this case, the already described tilting movement of the upper and the lower parts of the flow-deflecting device 10 is produced by corresponding cams along the oval path, on which rollers connected to the two parts of the flow-deflecting device 10 roll under spring preloading. Thus, a single chain drive can be used to produce the oval movement of the flow-deflecting devices 10, the rotary movement of the container 18 is transmitted via the hoses 21, and the tilting movements of the upper and lower parts of the flow-deflecting devices 10 are produced by the rolling on the correspondingly shaped cams. The cams are not represented in the figures.

When the feed of coating means is to be switched off, this can be performed via a solenoid actuator 22 which is illustrated in FIG. 5, top right, which, by means of a mechanism which is not represented in detail can prevent the tilting movement of the upper and lower parts of the flow-deflecting device 10 into the introducing position 11 in the part of the oval path facing the lamp tubes 1.

What is claimed is:

1. A method for producing bulbs for lamps, in which lamp tubes (1) are coated with a coating (2) and dried thereafter, wherein, during coating and drying, the lamp tubes (1) are arranged with their longitudinal axis at an oblique angle to the horizontal and including means (9) for introducing the coating (2) into the lamp tubes (1) which switches a flow deflecting device (10) between an introducing position (11) and a discharging position (12), the coating (2) being introduced into the lamp tubes (1) in the introducing position (11) and being discharged into a return device (13) in the discharging position (12).

2. The method as claimed in claim 1, wherein the lamp tubes (1) rotate about their longitudinal axis in the oblique position.

3. The method as claimed in claim 2, wherein coating and drying are performed with the same oblique angular position and without interrupting the rotation about the longitudinal axis.

4. The method as claimed in claim 3, wherein, during coating and drying, the lamp tubes (1) are continuously transported by a device (3) for carrying out the method.

5. The method as claimed in claim 1, wherein the oblique angle is between 5° and 15°, possibly increased by a roll-in angle of the lamp tubes (1).

6. A device (3) for carrying out a method as claimed in claim 1, wherein the device (3) has a holding device (4) with one or more lamp tube positions situated at the oblique angle to the horizontal.

7. A device (3) as claimed in claim 6, wherein the device (3) has two transport devices (5, 5') acting separately on the lamp tubes (1) for producing a rotation of the lamp tubes (1) about the longitudinal axis by a speed difference of the transport devices (5, 5').

8. The device (3) as claimed in claim 6, wherein the device (3) has a stop device (6) at the end of the lamp tubes (1) which is the lower one in the longitudinal direction, which stop device also runs on the lamp tube (1) at an effective speed of a contact site (7).

9. The device (3) as claimed in claim 6, wherein the device (3) is fitted with a holding and transport device (4, 5) which has a chain drive which runs essentially transverse to the longitudinal axis of the lamp tubes (1) and is provided with supporting or bridging elements on the chain links in such a way that an essentially seamlessly coherent transport path is formed in a position of the chain links running longitudinally extended relative to the transport.

10. The device (3) as claimed in claim 8, wherein the holding and transport device (4, 5) has two of said chain drives, of which one forms the stop device (6).

11. The device (3) as claimed in claim 6, wherein the device (3) is fitted with a transport device (5') which has a chain drive running essentially transverse to a longitudinal axis of the lamp tubes (1) and is provided with separating elements (8) which separate the lamp tubes (1).

12. A device (3) for carrying out a method as claimed in claim 2, wherein the device (3) has a holding device (4) with one or more lamp tube positions situated at the oblique angle to the horizontal.

13. The device (3) as claimed in claim 7, wherein the device (3) has a stop device (6) at the end of the lamp tubes (1) which is the lower one in the longitudinal direction, which stop device also runs on a lamp tube (1) at an effective speed of a contact site (7).

14. The device (3) as claimed on claim 7, wherein the device (3) is fitted with a holding and transport device (4, 5) which has a chain drive which runs essentially transverse to the longitudinal axis of the lamp tubes (1) and is provided with supporting or bridging elements on the chain links in such a way that an essentially seamlessly coherent transport path is formed in a position of the chain links running longitudinally extended relative to the transport.

15. The device (3) as claimed on claim 8, wherein the device (3) is fitted with a holding and transport device (4, 5)

which has a chain drive which runs essentially transverse to the longitudinal axis of the lamp tubes (1) and is provided with supporting or bridging elements on the chain links in such a way that an essentially seamlessly coherent transport path is formed in a position of the chain links running longitudinally extended relative to the transport.

16. The device (3) as claimed in claim 9, wherein the holding and transport device (4, 5) has two of said chain drives, of which one forms the stop device (6).

17. The device (3) as claimed in claim 7, wherein the device (3) is fitted with a transport device (5') which has a chain drive running essentially transverse to a longitudinal axis of the lamp tubes (1) and is provided with separating elements (8) which separate the lamp tubes (1).

* * * * *